INVENTOR.
GEORGE E. MEDAWAR
BY
Edwin D. Grant
ATTORNEY

United States Patent Office 3,611,726
Patented Oct. 12, 1971

3,611,726
THRUST AUGMENTING AND SOUND
SUPPRESSING APPARATUS FOR A
JET ENGINE
George E. Medawar, San Diego, Calif., assignor to
Rohr Corporation, San Diego, Calif.
Filed Sept. 29, 1969, Ser. No. 861,850
Int. Cl. F02k 1/02, 3/02
U.S. Cl. 60—264
3 Claims

ABSTRACT OF THE DISCLOSURE

Thrust gas of jet engine is discharged from frusto-conical nozzle. Cylindrical forward end of tubular ejector is concentrically spaced around end of nozzle so that slipstream air flowing past the latter enters ejector in annular stream surrounding thrust gas issuing from nozzle. The aft end of the ejector is rectangular and has vanes mounted therein, the long sides of said aft end extending vertically.

SUMMARY OF THE INVENTION

This invention relates to jet-propelled aircraft and more particularly to a nozzle and ejector arrangement for suppressing the noise generated by exhaust gas streams of such aircraft while augmenting the thrust thereof.

Part of the noise associated with the operation of a jet-propelled aircraft results from the flow through the atmosphere of the high velocity, high temperature exhaust gas which is discharged from the engine, or engines, thereof. The amount of noise so generated by streams of exhaust gas is proportionate to their temperature and velocity. It has also been found that the direction in which the major portion of the noise of a jet engine exhaust stream travels depends upon the geometric shape of said stream and the pattern of flow turbulence which results from its shearing action with atmospheric air. In accordance with the present invention, atmospheric air is mixed with jet engine exhaust gas (or exhaust gas and fan air, in aircraft which utilize fan-jet engines) to thereby produce a stream the temperature and velocity of which are lower than the temperature and velocity of the exhaust gas alone. The noise of the combined stream of air and thrust gas is thus less than that which would be generated if the exhaust gas were discharged to the atmosphere as a separate stream. In addition, the apparatus disclosed herein discharges the combined air and exhaust gas to the atmosphere in a plurality of substantially flat streams each of which has a maximum dimension in the vertical direction and a minimum dimension in the horizontal direction, which causes the greater portion of the noise of said stream to radiate horizontally rather than upwardly or downwardly to the surface of the earth.

More specifically, in the preferred embodiment of the present invention thrust gas of a jet engine is discharged from a tubular member which has a thrust augmenting ejector extending from the aft end thereof. The tubular member may be an aircraft fuselage or engine nacelle, or a jet engine tailpipe exposed to the atmosphere at its aft end. The forward end of the ejector is cylindrical and concentrically spaced around the aft end of the tubular member so that slipstream air flowing past the latter enters the forward end of the ejector. At its aft end the ejector is rectangular in cross-section, with the long sides thereof extending vertically (i.e., parallel with the yaw axis of the aircraft). A plurality of vertically extending vanes are evenly spaced apart across the exit of the ejector and thus divide the air and thrust gas flowing therethrough into a plurality of flat streams having a maximum dimension in the vertical direction and a minimum dimension in horizontal direction. For the reasons stated hereinbefore, the arrangement of the apparatus which has been briefly described reduces the noise associated with the operation of a jet engine and redistributes the remainder in a manner less perceivable to persons on the ground.

DETAILED DESCRIPTION

Figure 2:
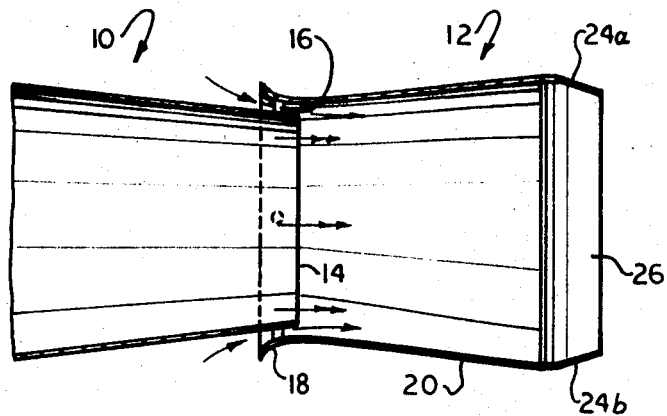
FIG. 2 is a longitudinal sectional view of the same apparatus, taken along the plane represented by the line designated 2—2 in FIG. 1 and in the direction indicated by arrows in the latter drawing.

In the drawings reference number 10 designates generally the frusto-conical aft portion of a tubular member from which thrust gas of a jet engine is discharged, said thrust gas being represented by double-headed arrows in FIG. 2. Member 10 may be a jet engine nozzle, or a housing surrounding the latter, such as the fuselage or engine nacelle of an aircraft. The outer surface of member 10 is exposed to the atmosphere so that slipstream air, represented by single-headed arrows in FIG. 2, flows therealong during the flight of the aircraft of which the member is a part. A tubular ejector, generally designated by the number 12, is mounted at the aft end of member 10 in coaxial relation therewith, a portion of said ejector being broken away in FIG. 1 so that the aft edge 14 of member 10 can be seen. More particularly, a plurality of struts 16 are fixedly attached to the aft end of member 10 and project radially from the outer surface thereof, and the outer ends of these struts are fixedly attached to the inner surface of the ejector at the forward portion 18 of the latter. Forward portion 18 is disposed in concentric, spaced relation around the aft end of member 10 and flares outwardly therefrom so as to intercept a relatively large amount of the slipstream air flowing along said member, the aft end of the latter extending into the throat of the ejector. Both the aft edge 14 of tubular member 10 and the forward edge of ejector 12 respectively lie in planes perpendicular to the common longitudinal axis of said member and ejector.

Figure 1:
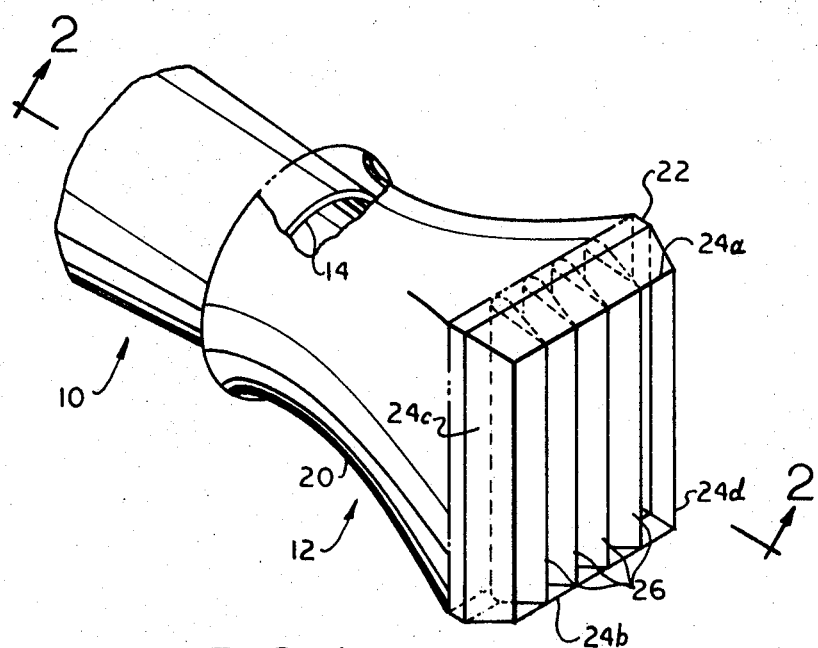
FIG. 1 is a pictorial representation of the preferred embodiment of the invention.

Ejector 12 also comprises a middle or transition portion 20 which gradually changes in cross-sectional shape so that at the point designated 22 in FIG. 1 the wall of said ejector is rectangular in form, with its long sides extending vertically (i.e., substantially parallel with the yaw axis of the aircraft). Four planar sides 24a–24d of the ejector are respectively attached to the linear aft edges of the transition portion 20 thereof and extend rearwardly therefrom, these sides converging in the downstream direction and their aft edges also lying in a plane perpendicular to the longitudinal axis of the ejector and tubular member 10. A plurality of vanes 26 are mounted in spaced, parallel relation within the aft end of ejector 12 and extend between, and are fixedly attached to, the inner surfaces of sides 24a and 24b thereof. As illustrated by broken lines in FIG. 1, each vane 26 has a streamlined cross sectional form.

OPERATION

During the flight of the aircraft of which the described and illustrated apparatus is a part slipstream air flowing along the outer surface of tubular member 10 enters ejector 12 in an annular stream which surrounds the thrust gas discharged from said tubular member. This air augments the thrust of the propulsion assembly in accordance with well-known principles of jet propulsion. Furthermore, the temperature and velocity of the stream of air and thrust gas discharged from the ejector are lower than the temperature and velocity of the thrust gas discharged from member 10, and thus the noise generated by the air-thrust gas stream is less than that which would result from the discharge of the thrust gas to the atmosphere without mixing air therewith inside the ejector. The manner in which the mixed air and thrust gas is discharged to the atmosphere (namely, as a plurality of substantially flat streams each having a maximum dimension in the vertical direction and a minimum dimension in the horizontal direction) also reduces the amount of noise which travels to the surface of the earth lying under the flight path of an aircraft equipped with the disclosed apparatus, since most of the sound energy which emanates from said streams travels laterally from the vertically extending boundaries thereof.

It should be noted that the net cross-sectional area through which air and thrust gas can flow at the aft end of ejector 12 must not exceed a predetermined size. Hence in the preferred embodiment of the invention vanes 26 are positioned with the aft end of the ejector to reduce the flow area thereof while permitting the length of sides 24a, 24d to be large, particularly in the vertical direction. However, if the cross-sectional exit area of the ejector is only that which is required for efficient operation, the vanes can be omitted.

When the invention is used in connection with an aircraft propelled by a fan-jet engine, both fan air and exhaust gas of the engine are preferably discharged through tubular member 10. For the purpose of interpretation of claims appended hereto, the term "thrust gas" is thus to be considered as applying to either exhaust gas alone or a mixture of exhaust gas and fan air.

Although the invention has been described and illustrated by reference to a single embodiment thereof, it should be understood that the same has been presented for the purpose of example only and is not to be considered as limitative, the scope of the invention being limited only by the terms of the appended claims.

What is claimed as new and useful and desired to be secured by U.S. Letters Patent is:

1. In an aircraft having a jet engine, the combination comprising:

a tubular member from which thrust gas of said engine is discharged, said member being substantially circular in cross section at the downstream end thereof and the latter being exposed to the atmosphere so that air flows therealong during the flight of said aircraft; and a tubular ejector mounted in substantially coaxial relation with said tubular member and extending downstream therefrom, the forward end of said ejector being substantially cylindrical and spaced outwardly from the aft end of said tubular member, the aft end of said ejector being rectangular and the long sides thereof being substantially parallel with the yaw axis of said aircraft, whereby air flowing along said tubular member enters said ejector in a substantially annular stream surrounding said thrust gas; and a plurality of vanes mounted in spaced, parallel relation within and extending across the aft portion of said ejector between oppositely disposed sides thereof, the sides of said vanes being parallel with the flow of air and thrust gas through said nozzle whereby said air and thrust gas flows from said ejector in a plurality of substantially flat streams having a maximum dimension parallel with said yaw axis.

2. The combination defined in claim 1 wherein the length of the long sides of said ejector aft end is greater than the diameter of the aft end of said tubular member.

3. The combination defined in claim 1 wherein the sides of said ejector aft end converge in the downstream direction.

References Cited
UNITED STATES PATENTS

| | | | |
|---|---|---|---|
| 3,033,494 | 5/1962 | Tyler et al. | 181—33.221 |
| 3,143,184 | 8/1964 | Denning et al. | 60—264 |
| 3,187,501 | 6/1965 | Quick | 60—264 |

BENJAMIN W. WYCHE, Primary Examiner

W. E. OLSEN, Assistant Examiner

U.S. Cl. X.R.

181—33.221; 239—265.13